UNITED STATES PATENT OFFICE.

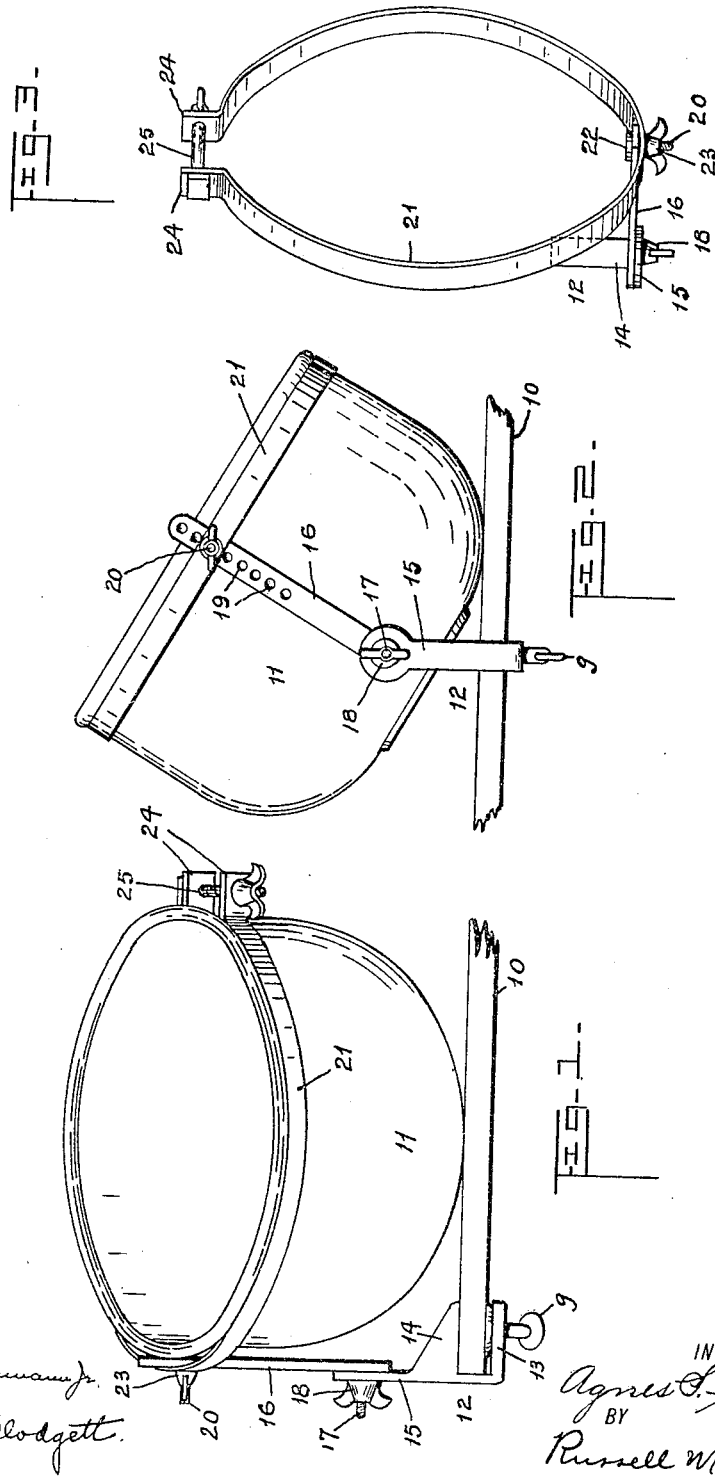

AGNES S. FRAMBACH, OF NEWARK, NEW JERSEY.

BOWL-HOLDER.

No. 927,722.  Specification of Letters Patent.  Patented July 13, 1909.

Application filed March 13, 1909. Serial No. 483,107.

*To all whom it may concern:*

Be it known that I, AGNES S. FRAMBACH, a citizen of the United States, residing at Newark, in the county of Essex and State of New Jersey, have invented certain Improvements in Bowl-Holders, of which the following is a specification.

The objects of this invention are to provide a device for holding a bowl in tilted position upon a table top, as the same is commonly held by hand for beating an egg or the like; to thus enable the hand which would otherwise hold the bowl to be free for other purposes, such as pouring in an ingredient; to secure a simple, durable and efficient construction, which can be manufactured and sold at little expense, and will not be difficult to manipulate or clean, and to obtain other advantages and results as may be brought out in the following description.

Referring to the accompanying drawings, in which like numerals of reference indicate corresponding parts in each of the several figures, Figure 1 is a front view of a bowl tipped forward and held in position upon a table by my improved holder; Fig. 2 is a side view of the same, and Fig. 3 is a plan of the bowl holder with the bowl removed.

In said drawings, 10 indicates a table top or the like support, upon which the bowl 11 is to be held in tipped or tilted position, so that the cook can beat the contents of said bowl with a spoon in one hand while with the other hand she pours an ingredient into the bowl. The base portion 12 of my device has jaws 13, 14 adapted to receive between themselves the edge of the table 10, and the lower jaw 13 has threaded into itself a clamping screw 9 adapted to be forced against the table top in opposition to the jaw 14, whereby the base portion 12 is clamped to the table with great firmness and rigidity. The said base portion 12 has at its top an upwardly projecting standard 15, and said standard is flattened in a vertical plane coincident with or parallel to the edge of the table top. Against the side of this standard 15, and preferably the side toward the table top, is pivoted a flattened arm 16, which arm is thus adapted to swing in a vertical plane parallel to, or passing through, the edge of the table top. To effect such pivoting of the arm 16 to the standard 15, their ends overlap, preferably being enlarged for greater strength and friction, and a bolt 17 projects from the arm 16 through a hole in the standard 15, said bolt being threaded to receive a clamping wing-nut 18.

The upper end portion of the arm 16 has a series of holes 19, any one of which is adapted to receive a bolt 20 which serves to hold a bowl band 21 in place on said arm 16. This bowl band 21 is a more or less flexible hoop, preferably of sheet-metal, which is adapted to surround the top part of the bowl, as shown in Figs. 1 and 2 of the drawings. Said band 21 lies outside of the arm 16, or on the opposite side thereof from the bowl. The said bolt 20, which extends through perforations in the arm 16 and band 21, has at the side of said arm next the bowl a head 22, and outside the band 21 a nut 23 is provided upon the bolt by means of which the hoop or band 21 can be clamped in fixed position upon the arm 16. It will be understood that the plane of the hoop or band 21 is always perpendicular to the arm 16, and thus said band in spite of its curvature always seats nicely and firmly upon the arm 16. The hoop or band 21 is split or divided at a point opposite to, or away from, the attachment of the said band to the arm 16, and the extremities of the hoop ends are bent outward, as at 24, 24, and perforated to receive a clamping bolt 25 by means of which said ends 24 may be brought near together or allowed to separate. This construction enables the said band 21 to be fitted accurately and tightly to bowls of various sizes, and to thus hold them all securely.

In using my improved bowl holder, the base portion 12 is clamped to the table edge and then the band or hoop 21 adjusted to its proper height upon the arm 16 and clamped tight around the bowl. Adjustment of the angular relation between the standard 15 and arm 16, by means of the screw or a bolt 17, enables the bowl to be held at any desired angle, and always with the same firmness and rigidity.

By my improved construction, which provides the tilting or swinging joint near the base of the bowl, where the ends of the standard 15 and arms 16 overlap, the angular adjustment of the bowl is always made independent of the grasping or gripping of the bowl by the device. That is to say, the clamping of the band or hoop 21 upon the bowl does not disturb or affect in any way the position of the arm 21. The two features are entirely independent.

Having thus described the invention, what I claim is:

1. In a device of the character described, a base portion having means for attachment to a table or the like and a standard adapted to project upward from said table, an arm pivoted to said standard to swing in a vertical plane, means for clamping said arm and standard in fixed relation, a split band or hoop adapted to extend around the top of a bowl arranged on the upper end of said arm in a plane perpendicular thereto, a bolt passed through said band and arm and having a head at the inner side of the arm or side next the opening of the band, a wing nut upon the opposite end of said bolt adapted to clamp said band with respect to the arm, and means for adjusting said band upon said arm and for tightening it upon a bowl.

2. In a device of the character described, a base portion having means for attachment to a table or the like, supporting means adapted to project vertically upward from said base portion and providing near its top a vertical series of transverse holes, a split band or hoop at the upper end of said supporting means in a plane transverse thereto, a bolt passed through said band and one of the holes in the supporting means and having a head within the opening of the band, a wing nut upon the opposite end of said bolt adapted to clamp said band with respect to the supporting means, and means for tightening said band upon a bowl.

AGNES S. FRAMBACH.

In presence of—
FRANCES E. BLODGETT,
RUSSELL M. EVERETT.